Dec. 17, 1968  D. W. NEALE  3,416,820
MOTOR VEHICLE ACCESSORY MOUNTING
Filed Jan. 10, 1967  3 Sheets-Sheet 1

INVENTOR:
DAVID WARWICK NEALE
BY Kurt Kelman
AGENT

Dec. 17, 1968   D. W. NEALE   3,416,820
MOTOR VEHICLE ACCESSORY MOUNTING
Filed Jan. 10, 1967   3 Sheets-Sheet 2

INVENTOR:
DAVID WARWICK NEALE
BY Kurt Kelman
AGENT

Dec. 17, 1968　　D. W. NEALE　　3,416,820
MOTOR VEHICLE ACCESSORY MOUNTING
Filed Jan. 10, 1967　　3 Sheets-Sheet 3
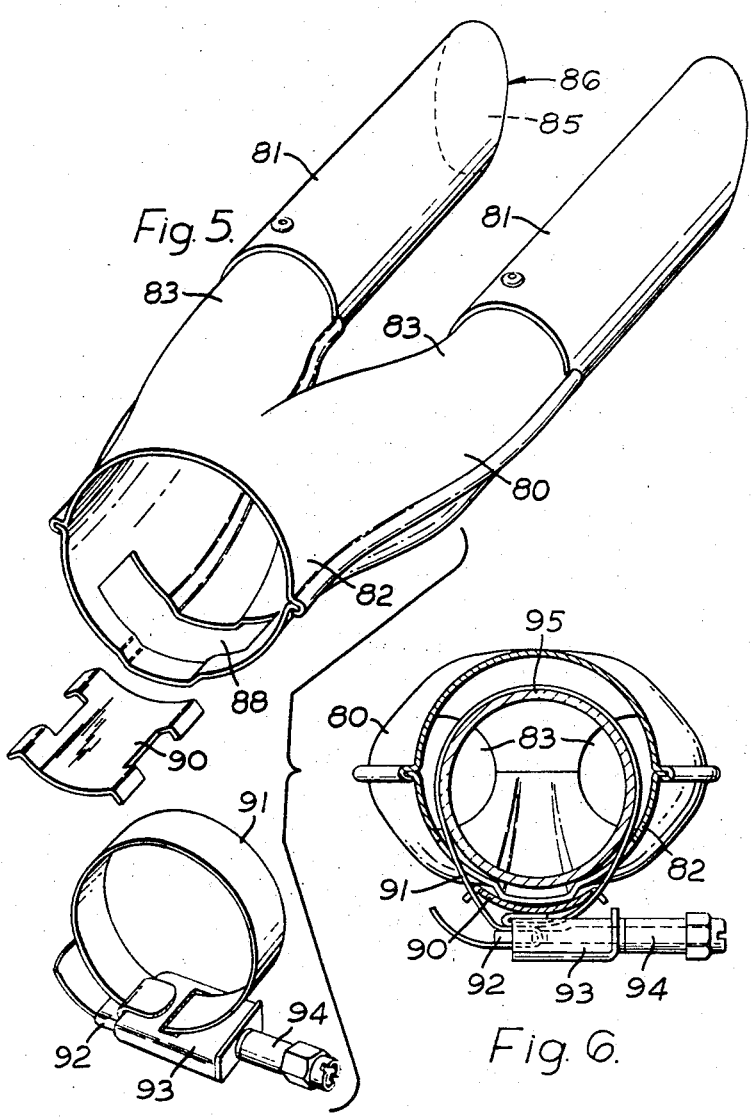
INVENTOR:
DAVID WARWICK NEALE
BY Kurt Kelman
AGENT United States Patent Office 3,416,820
Patented Dec. 17, 1968

3,416,820
MOTOR VEHICLE ACCESSORY MOUNTING
David Warwick Neale, Stourport, England, assignor to Raydyot Limited, Stafford, England, a British company
Filed Jan. 10, 1967, Ser. No. 608,299
Claims priority application Great Britain, Oct. 19, 1966, 46,645/66
4 Claims. (Cl. 285—399)

ABSTRACT OF THE DISCLOSURE

Mounting of an accessory such as an exhaust attachment on a rounded component of a motor vehicle such as a tail pipe. The body of the accessory includes a component receiving socket having a curved wall formed with a slot. A component encircling, contractible band is disposed in the socket and projects outwardly through the slot. A removable bridging member is seated exteriorly on the socket wall across the slot and the projecting portion of the band extends over the bridging member so that the latter and the socket wall are clamped against a vehicle component when the band is contracted.

---

This invention relates to motor vehicle accessories of the kind adapted for attachment to substantially rounded parts of motor vehicles, such as tubes, bars, or lugs thereof by contractible band clips encircling the rounded parts. Examples of such accessories are an exhaust deflector for attachment to an exhaust pipe or tail pipe and a badge for attachment to a badge bar.

Conventionally, such accessories are provided with a tongue or a collar which is clamped to the rounded part by a band clip encircling both the tongue or collar and the rounded part. In some cases the band clip entirely encircles the tongue or collar and in other cases the band clip is threaded through a pair of slots in the tongue or collar so that a small portion of the latter between the slots contacts the rounded part.

Objects of this invention are to provide a motor vehicle accessory of the kind referred to which is particularly easily attachable to any one of a number of rounded parts of diameters varying within limits and which may be less liable to suffer from metal fatigue when attached to such rounded part.

In accordance with this invention, a motor vehicle accessory of the kind referred to comprises a body having an arcuate attachment part with a slot defined therein, a contractible band clip for location within the arcuate attachment part with an arcuate portion of the contractible band clip extending through the slot, and a separable bridging member for location between the arcuate portion of the contractible band clip and the arcuate attachment part so as to bridge the slot and extend generally transversely thereof, whereby contraction of the contractible band clip about a rounded part clamps the arcuate attachment part between the bridging member and the rounded part.

Two preferred embodiments of the invention as applied to motor vehicle exhaust attachments are now particularly described with reference to the accompanying drawings, wherein:

FIGURE 5 is a perspective view of a second embodiment of an exhaust deflector according to the invention; and FIGURE 6 is a sectional elevation of the embodiment of FIGURE 5.

Figure 1:
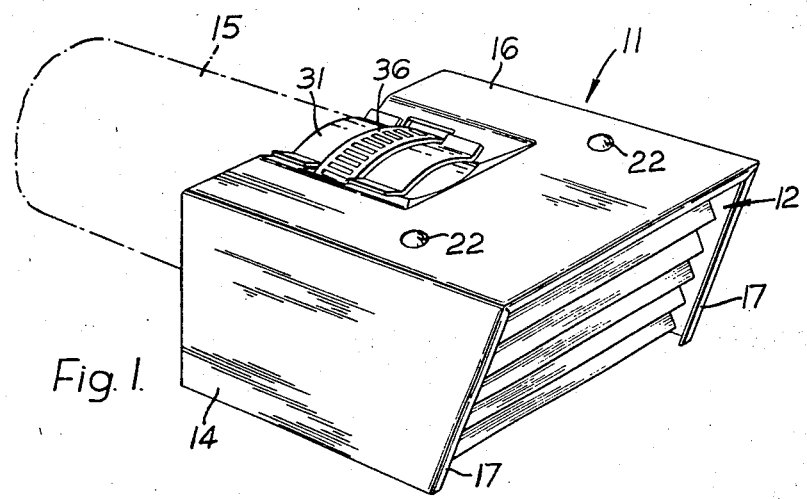
FIGURE 1 is a front perspective view of an exhaust deflector according to the invention, shown secured to an exhaust pipe.
Figure 2:
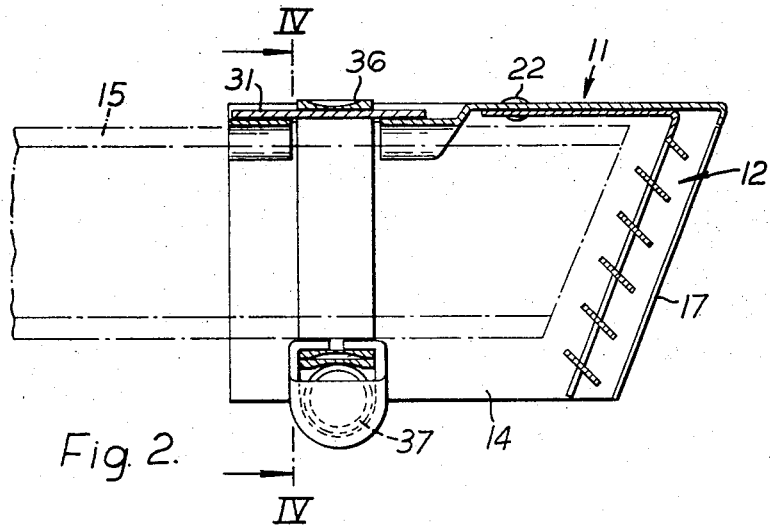
FIGURE 2 is a sectional elevation of the deflector of FIGURE 1.

Referring initially, particularly to FIGURES 1 and 2, the first embodiment of an exhaust deflector according to the invention comprises a body 11 and a louvred member 12.

The body 11 is a metal pressing and has a rectangular channel section and the louvred member 12 is a metal pressing or casting and is attached to the body to close one end of the channel.

In use, the parallel sides 14 of the body lie on opposite sides of an exhaust pipe 15 and the connecting top 16 lies over the exhaust pipe, the lower side of the pipe remaining uncovered.

Each parallel side 14 has an inclined edge adjacent the closed end of the body, the inclination being acute to the plane of the connecting top 16. The marginal edges 17 of the channel at the closed end of the body are inturned to provide a neat appearance and for strength.

The louvred member 12 comprises a louvred part and an attachment part (FIGURE 2) in a single, angled pressing or casting. The louvred part comprises a frame supporting a set of louvres. The attachment part is fastened to the connecting side by rivets 22 (or by spot-welding or the like) so that the frame extends adjacent and parallel to the inclined edges of the channel parallel sides 14.

The louvres are constituted by a series of parallel plates mounted in the frame, each louvre being inclined to the frame. The angle between the frame and the attachment part is such that the frame bisects the angle between the axis of the exhaust pipe and the desired direction of the issuing stream of gases after deflection. The louvre throats can thereby be of maximum area with minimum obstruction to the gas stream. The desired direction of the issuing stream is at a downward inclination sufficient to carry the exhaust gases away from the motor vehicle.

As the deflection of the gases is produced by the louvres, the deflector is efficient even with the exhaust pipe end in contact with the louvred member so that there need be very little extension of the deflector beyond the end of the pipe.

Figure 3:
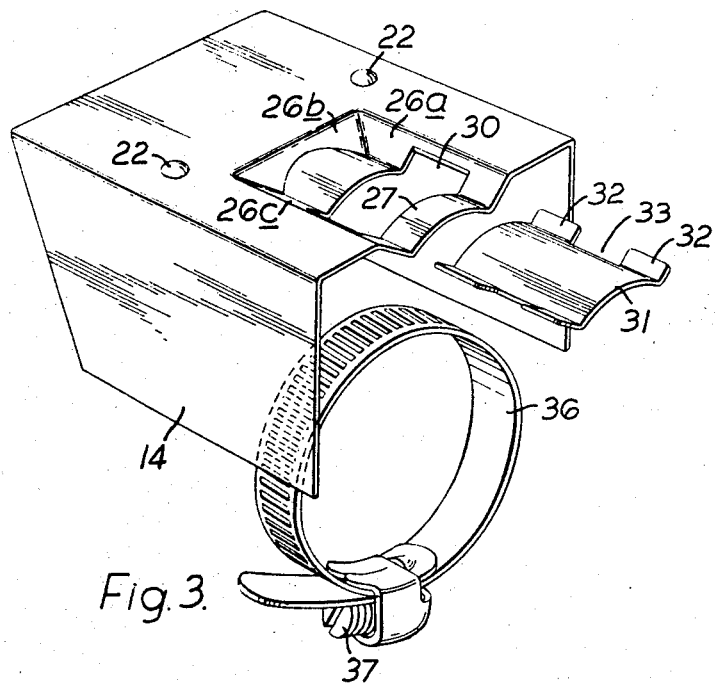
FIGURE 3 is a rear, perspective view of the deflector of FIGURES 1 and 2 prior to being secured to the exhaust pipe.
Figure 4:
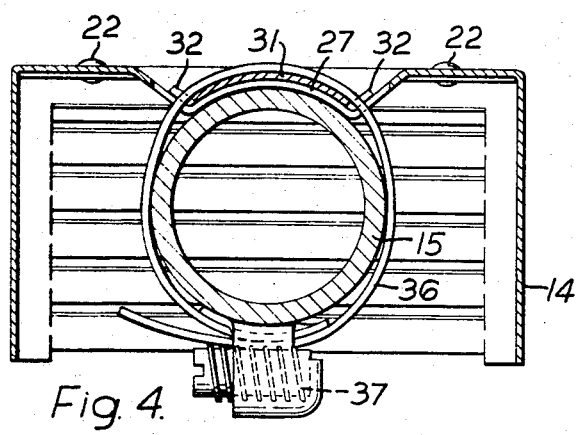
FIGURE 4 is a section on line IV—IV of FIGURE 2.

The connecting top 16 of the body has a recess adjacent the open end (FIGURES 3 or 4) defined by three inclined walls 26a, b and c, and a base forming an attachment part 27, the latter being arcuately shaped and arranged to seat on the vehicle exhaust pipe over a discrete length thereof (along the pipe axis) and over an arc around a portion of the pipe periphery (FIGURE 4).

A slot 30 is formed in the arcuate attachment part 27, extending substantially normally of the parallel sides 14 of the body and also extending beyond the arcuate attachment part 27 into the two oppositely adjoining inclined walls 26a and 26c.

A bridging member 31 has a part-cylindrically shaped portion to seat on the base 27 of the recess so as to bridge the slot 30, and has a pair of lugs 32 extending from each parallel side of the part-cylindrical portion and inclined thereto, to seat on the opposed inclined walls 26a and 26c of the body recess. A rebate 33, substantially of a length equal to the slot 30 width, is defined between each pair of lugs 32.

The deflector is secured to an exhaust pipe by a contractible band clip 36, for example worm-driven 37. An arcuate portion of the band clip 36 is located to extend through the slot 30 in the body 11 and the bridging member 31 is then inserted between the clip 36 arcuate portion and the body 11 so as to bridge the slot 30. The band clip 36 is then passed over the pipe 15 with the body 11 located over the end of the pipe. On tightening of the band clip 36 about the exhaust pipe 15 by means of the worm 37, the body of the deflector is clamped between the bridging member 31 and the exhaust pipe 15 with the band clip 36 seating in the rebates 33 between the lugs 32. The lugs 32 serve to prevent excessive relative movement between the band clip 36 and the bridging member 31 and also serve to prevent lateral movement of the bridging member 31 relative to the arcuate attachment.

Hence, the deflector can be particularly easily secured to an exhaust pipe without any necessity to thread the band clip through slots in the deflector body.

A second embodiment of the invention, shown in FIGURES 5 and 6, is an exhaust extension and comprises a body 80 and a pair of extension tubes 81.

The body 80 has a collar 82 and a pair of tubular outlet portions 83. The extension tubes 81 are rivetted and/or welded to respective outlet portions 83 so as to constitute extensions thereof. Alternatively, the body and the extension tubes can be integrally formed.

The end part of each extension tube 81 remote from the body 80 has a portion cut-away at an inclination to the extension tube axis so as to define an elliptical exhaust exit 85 and a shield 86.

In use the body 80 is attached to an exhaust pipe 95 (FIGURE 6) by the collar 82 so as to receive exhaust gases adjacent the collar 82. The gases are propelled along both tubular extensions 81 and expelled through the respective exists 83, the respective shields 86 serving to obstruct upward movement of the exhaust gases.

A slot 88 is formed in the collar 82, extending substantially normally of the axis of the inlet portion.

A bridging member 90 is part-cylindrically shaped similarly to that described for the previous embodiment.

The exhaust extension is secured to exhaust pipe 95 by a contractible band clip 91, contraction thereof being provided by attaching opposite ends to the clip to respective relatively movable elements 92 and 93, relative movement of which is achieved by rotation of internally threaded sleeve 94, screw-engages with one element 92.

An arcuate portion of the band clip 91 is located to extend through the slot 88 in the body 80 and the bridging member 90 is then inserted between the arcuate portion of the clip and the collar 82, so as to bridge the slot 88. The band clip is passed over an exhaust pipe with the collar 82 encircling the pipe. On contraction of the band clip about the exhaust pipe 95, the collar 82 of the body is clamped between the bridging member 90 and the exhaust pipe.

Exhaust extensions of this type are particularly prone to metal fatigue due to their considerable extension beyond the end of the exhaust pipe. It has been found that damage from fatigue is much reduced using the attachment means described above, the life of the extension being increased by an estimated 600%.

The invention also makes it unnecessary for the curvature of the collar of the extension to be substantially the same as the curvature of the exhaust pipe to which the extension is attached, and the extension can therefore be used with exhaust pipes of varying sizes.

I claim:

1. An accessory attachable to a rounded component of a motor vehicle, said accessory comprising a body including a component receiving socket having a curved component seating wall provided with a slot, a contractible component encircling band disposed in said socket with a portion of the band projecting outwardly through said slot, and a removable bridging member seated exteriorly on portions of said wall at opposite sides of the slot, a region of said member bridging said slot having a dimension shorter than the length of the slot so that said band may extend outwardly through the slot with the projecting portion of the band overlying said bridging member, whereby the latter and said socket wall may be clamped against a vehicle component when the band is contracted.

2. The device as defined in claim 1 wherein said socket also includes a pair of inclined wall portions extending outwardly from opposite ends of said curved component seating wall, said bridging member being curved complementally to the component seating wall and the slot in said wall extending into said inclined wall portions longitudinally beyond the slot bridging region of said member, said band projecting through end regions of said slot in said inclined wall portions.

3. The device as defined in claim 2 together with outwardly inclined lugs provided on said bridging member and resting on said inclined wall portions at opposite sides of said band, whereby to prevent displacement of the bridging member relative to said component seating wall in a direction transverse to said slot.

4. The device as defined in claim 1 together with lugs provided on said bridging member at opposite sides of said band, whereby to prevent displacement of the bridging member relative to said component seating wall in a direction transverse to said slot.

References Cited

UNITED STATES PATENTS

| | | | |
|---|---|---|---|
| 1,674,535 | 6/1928 | Verville | 98—2 XR |
| 2,308,607 | 1/1943 | Jackson | 285—253 XR |
| 2,681,608 | 6/1954 | Wunderlich | 98—2 |
| 2,750,864 | 6/1956 | Maki | 98—2 |

FOREIGN PATENTS 852,716   11/1939   France.

ROBERT A. O'LEARY, *Primary Examiner.*

M. A. ANTONAKAS, *Assistant Examiner.*

U.S. Cl. X.R.

98—58, 2; 285—176